June 2, 1925.

C. H. BARKER

GRAIN LOADER 1,540,239

Original Filed July 30, 1920    2 Sheets-Sheet 1

INVENTOR
C. H. Barker
BY
ATTYS

June 2, 1925.

C. H. BARKER 1,540,239

GRAIN LOADER

Original Filed July 30, 1920   2 Sheets-Sheet 2

INVENTOR
C. H. Barker
BY
ATTYS

Patented June 2, 1925.

1,540,239

UNITED STATES PATENT OFFICE.

CHARLES HENRY BARKER, OF TREGARVA, SASKATCHEWAN, CANADA.

GRAIN LOADER.

Application filed July 30, 1920, Serial No. 400,054. Renewed February 27, 1925.

*To all whom it may concern:*

Be it known that I, CHARLES HENRY BARKER, of the town of Tregarva, in the Province of Saskatchewan, Canada, have invented certain new and useful Improvements in Grain Loaders, of which the following is the specification.

The invention relates to improvements in grain loaders and the general object of the invention is to provide an agricultural implement which can be drawn over the field and will pick up the grain lying loose on the field, elevate it and discharge it into a winding belt to form a load and then afterwards discharges the load from the belt on to a cross conveyor having an elevated end, such construction preventing the threshing of the grain and the consequent saving of the seed.

A further object is to construct the machine so that it is at all times under the direct control of the attendant, the various working parts being arranged so that they can be thrown into and out of commission as occasion demands.

With the above more important objects in view the invention consists essentially in the arrangement and construction of parts hereinafter more particularly described and later pointed out in the appended claims, reference being had to the accompanying drawings in which:—

In the drawings like characters of reference indicate corresponding parts in the several figures.

Figure 1:
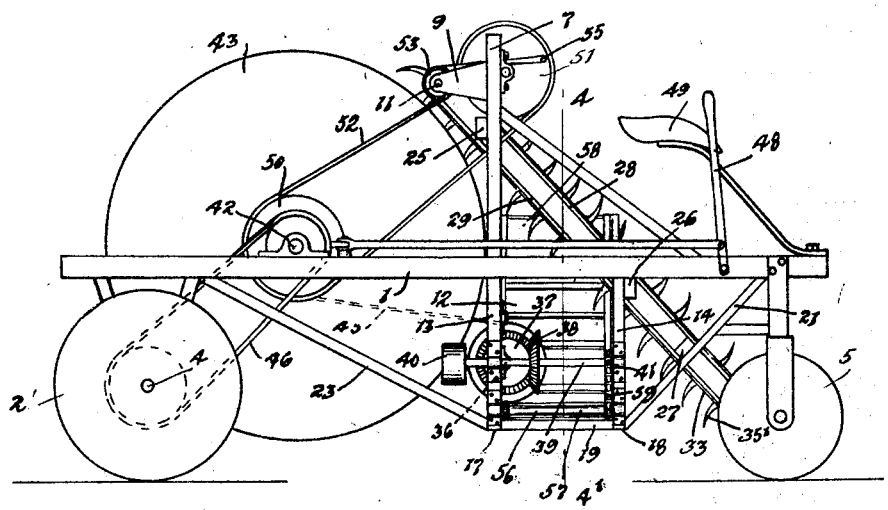
Fig. 1 is a side view of the complete machine.
Figure 2:
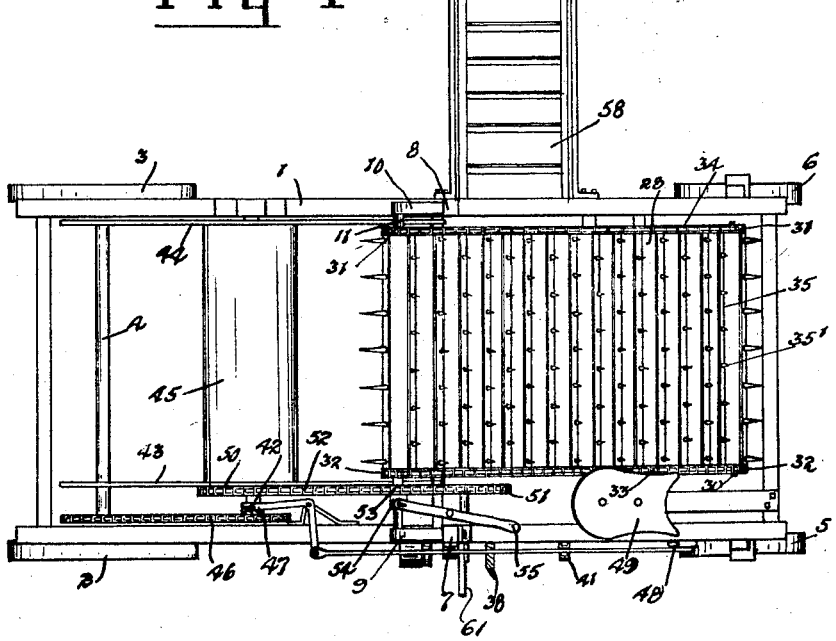
Fig. 2 is a plan view thereof.

I wish to state that in so far as the present application is concerned I do not consider the various minor details of importance as the invention relates more particularly to the novel means employed for collecting the grain picked up from the field by the pick up conveyor and the means employed for receiving and discharging the grain from the latter means.

Referring now to the drawings:—

1 represents a substantially open centered rectangular frame mounted rearwardly on traction wheels 2 and 3 located at the ends of a driving shaft 4 and forwardly on a pair of independent castor wheels 5 and 6, the latter wheels being steered over the field by draft tongues (not shown) secured thereto.

More or less centrally of the length of the frame I locate two uprights 7 and 8, the upper ends of which carry hangers 9 and 10 which support rotatably the upper conveyor cross shaft 11. More or less centrally beneath the main frame I locate an under structure 12 presenting downwardly extending corner beams 13, 14, 15 and 16 and cross and end beams 17 and 18, 19 and 20 connecting the corner beams. Brace beams 21 and 22 extend forwardly angularly between the under structure and the main frame and angularly disposed rear braces 23 and 24 extend rearwardly between the under structure and the main frame.

The uprights 7 and 8, the main frame and the braces 21 and 22 support cross beams 25, 26 and 27 and these beams are utilized to support a pair of parallel angularly disposed carrier plates 28 and 29 which form the body part of the pick up conveyor.

As will be seen the upper ends of these plates terminate adjoining the cross shaft 11, whilst the lower ends of the plates are located adjacent the ground at the front end of the machine where they are provided with bearings which carry rotatably the lower conveyor cross shaft 30.

On the upper and lower cross shafts I mount pairs of chain wheels 31 and 32 which carry conveyor chains 33 and 34, the chains being provided with cross slats 35 fitted with projecting pick-up prongs 35'. The ascending sides of the chains drag over the plate 28 and obviously when the conveyor is driven in a proper direction the prongs will pick up the grain lying on the field and elevate it to the highest point of the conveyor where it is discharged rearwardly over the end.

Whilst I have entered into the details of the construction of the conveyor I do not consider the details of the structure shown essential as any type of endless pick-up conveyor which will gather the grain from the ground and elevate it can be used to equal advantage.

The posts 13 and 15 of the under structure carry a counter shaft 36 which is fitted at one end with a bevel gear 37 meshed with a bevel pinion 38 secured to an auxiliary driving shaft 39 mounted on the corner posts 13 and 14. This auxiliary driving shaft is supplied at one end with a pulley 40 and at the other end with a chain wheel 41, the purposes of which will be later described.

Rearwardly of the main frame I mount a winding shaft 42 fitted within the frame with a pair of opposing discs 43 and 44 permanently secured to the shaft and forming with the shaft a winding drum. To the shafts 42 and 36 I connect a collecting belt 45 which is adapted in the loading operation to wind off the shaft 36 and around the shaft 42 and to have that part of the belt passing between the shafts slightly inclined to the horizontal and positioned directly underneath the rear end of the pickup conveyor which discharges on to the belt in a location between the discs. The shaft 42 is driven directly from the ground wheel 2 by means of a chain 46 and suitable chain wheels and a clutch indicated generally by the reference numeral 47 controls the drive between the shaft 4 and shaft 42, the clutch being under the control of a forwardly disposed lever 48 located adjacent the driver's seat 49. The arrangement of the clutch is such that when the clutch members are engaged the shaft 42 is driven by the shaft 4 and when disengaged the shaft 42 remains inert whilst the other shaft rotates. 50 is a chain wheel secured to the shaft 42 and 51 is an idler chain wheel mounted on the upright 7 and connected to the chain wheel 50 by a chain 52. The chain 52 passes underneath a chain wheel 53 mounted on the conveyor shaft 11. This latter chain wheel is normally free on the shaft and the drive of the conveyor is effected by the action of a clutch 54 directly under the control of a clutch lever 55 also extending towards the seat.

The under structure 12 carries a cross conveyor 56 which has a horizontal part 57 adapted to receive material from the belt 45 and an upwardly inclining end part 58 located at the side of the machine and of a height such that it will discharge material into an accompanying wagon or directly into the feeder of a threshing machine.

The conveyor 56 is driven by a chain 59 from the chain wheel 41 of the shaft 39, the driving of the shaft 39 being effected when desired by a driving belt applied on the pulley 40, and in order to effect the winding of the belt 45 on to the shaft 36 when desired I provide a clutch 60 on the shaft 36 and engagable with the gear 37, the clutch being controlled by a lever 61. In order to retard the winding of the belt off the shaft 36 I have supplied a flexible cable 62 fastened to the main frame and given a turn around the shaft 36 and provided at the lower end with a weight 63, the action of the cable and weight being to act as a friction brake on the said shaft.

When this machine is to be used the belt 45 is initially all wound on the shaft 36 and it is preferable to have the grain lying on the field without being tied in sheaves. This obviously can be accomplished by dispensing with the services of the customary knotter found on the present types of binding machines. In the picking up of the grain from the ground the clutches 47 and 54 are in and the clutch 60 is out with the result that the pick-up conveyor is driven in a proper direction to cause the prongs to lift the grain from the ground and elevate it and the shaft 42 is driven in a direction such that the belt 45 will be wound off the shaft 36 on to the shaft 42, the shaft 42 actually pulling the belt off the shaft 36, the clutch of which is free and the said shaft being prevented from spinning by the action of the weight and cable.

Figure 3:
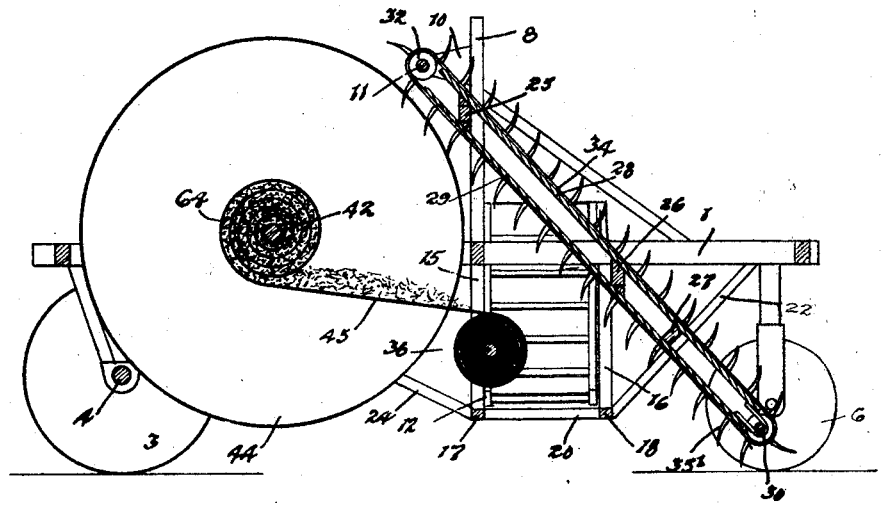
Fig. 3 is a longitudinal sectional view centrally through the machine.
Figure 4:
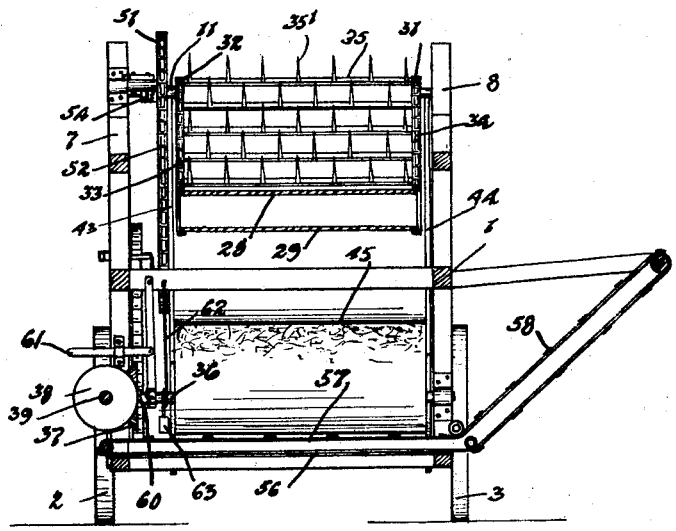
Fig. 4 is a vertical cross sectional view at 4—4' Fig. 1.

As the picked up grain is discharged from the upper end of the pick-up conveyor it falls directly on to the underlying part of the winding belt and as the belt winds, the grain caught thereon is wound spirally around the shaft 42 between the adjoining turns of the belt. This is best shown in Fig. 3 where the grain wound in the belt is indicated at 64. Here it is to be noticed that the ends of the belt are closed by the discs. A load is had when the space between the discs is practically filled with the grain at which time the driver throws out the clutches 47 and 54 to stop the drum and the pick-up conveyor. He then drives to the place where the load is to be discharged, such as to the feeder of a threshing machine. The pulley 40 is then belted to any suitable driving part of the thresher and the clutch 60 is thrown into commission. This causes the driving of the cross conveyor and also the turning of the shaft 36 in a direction which will wind the belt off the shaft 42 on to the shaft 36. Consequently the load of grain wound in the belt is discharged on to the cross conveyor and is carried up the inclined end 58 of the cross conveyor where it discharges into the self feeder of the threshing machine.

When the grain is all discharged the clutch 63 is thrown out and the machine is then ready to collect another load.

From the above it will be seen that there is very little threshing of the grain in my machine and that in any case any of the seeds which are knocked out of the heads are held in the drum and discharged on to the cross conveyor where they are elevated directly to the thresher.

What I claim as my invention is:—

1. In a grain loader, a pick-up device for picking up the grain from the ground and discharging the same, and a web receiving the grain discharged from the pick-up device for winding it between successive turns of the web and means for winding and unwinding said web.

2. In a grain loader, the combination with a pick-up device for lifting the grain from the ground and elevating and discharging the same, of a pair of shafts, a web having the ends thereof secured to the shafts means for alternately winding the web from one shaft on to the other, the portion of the belt between the shafts being exposed to receive grain discharged from the pick-up device.

3. In a grain loader, the combination with a pick-up device for lifting the grain from the ground and elevating and discharging the same, of a pair of shafts, a web having the ends thereof secured to the shafts, means for alternately winding the web from one shaft on to the other, the portion of the belt between the shafts being exposed to receive grain discharged from the pick-up device and a cross discharging conveyor having one end located adjacent one of the shafts and the other end elevated and located at the side of the machine.

4. In a grain loader, the combination with a pick-up device for lifting the grain from the ground and elevating and discharging the same, of a pair of rotatably mounted front and rear shafts, a winding belt connecting the shafts, clutch controlled means for alternately winding the belt on either of the shafts, said belt having an exposed portion adapted to receive the grain discharged from the pick-up device, means for throwing the pick-up device out of commission during the interval that the belt is winding on to the front shaft, a cross discharging conveyor located adjoining the front shaft and means for operating the conveyor during the interval that the drum is winding on to the front shaft.

5. In a grain loader, the combination with a pick-up device for lifting the grain from the ground and elevating and discharging the same, of a pair of front and rear shafts, a winding belt connecting the shafts and adapted to wind from one shaft on to the other and presenting an exposed part located beneath the discharge end of the pick-up device adapted to receive the grain discharged from the pick-up device, independent clutch controlled means for winding the belt on to either of the shafts, opposing discs located on the rear shaft at the edges of the belt, a cross discharging conveyor located adjoining the front shaft and adapted to receive the grain discharged from the belt when the belt is winding on to the front shaft and clutch controlled means adapted to drive the cross conveyor during the interval that the belt is winding on to the front shaft.

6. In a grain loader, a receiver comprising a pair of shafts, a web connected at its ends to said shafts, means for winding the web around one of said shafts to confine the grain delivered to the web between successive turns of the winding, and means for subsequently winding the web around the other of said shafts to discharge the stored grain.

7. In a grain loader, a receiver comprising a pair of shafts, a web connected at its ends to said shafts, discs carried by one of said shafts at opposite sides of the web, and means for winding the web from one shaft to the other shaft.

8. In a grain loader, the combination with a flexible winding element, of means for delivering the grain thereto, means for winding the flexible element about a fixed center with the grain confined between turns of the element and means for receiving the grain from the flexible element and discharging it from the machine during subsequent unwinding of the element.

9. The combination with a grain loader provided with grain collecting and discharging means, of a receiver for the collected grain operable to actively co-operate with the collecting means in effecting storage of the grain and with the discharging means when it is desired to deliver the collected grain from the loader, said receiver comprising a pair of rollers, a web extending between the rollers and secured thereto, and means for winding the web on either roller to coact either with the collecting or with the discharging means.

Signed at Regina, this 18th day of May 1920.

CHARLES HENRY BARKER.

In the presence of—
  B. S. LAURENCE,
  D. J. THOM.